(12) United States Patent
Yamada et al.

(10) Patent No.: US 7,931,936 B2
(45) Date of Patent: Apr. 26, 2011

(54) OPTICAL TRANSPARENT MEMBER AND OPTICAL SYSTEM USING THE SAME

(75) Inventors: Masayuki Yamada, Tokyo (JP);
Yoshinori Kotani, Yokohama (JP);
Hiroyuki Tanaka, Kawasaki (JP);
Takeharu Okuno, Utsunomiya (JP);
Tsutomu Minami, Osaka (JP);
Masahiro Tatsumisago, Osaka (JP);
Kiyoharu Tadanaga, Osaka (JP)

(73) Assignees: Canon Kabushiki Kaisha, Tokyo (JP);
Osaka Prefecture University, Osaka (JP)

( * ) Notice: Subject to any disclaimer, the term of this patent is extended or adjusted under 35 U.S.C. 154(b) by 0 days.

(21) Appl. No.: 12/257,590

(22) Filed: Oct. 24, 2008

(65) Prior Publication Data
US 2009/0081361 A1 Mar. 26, 2009

Related U.S. Application Data

(62) Division of application No. 11/355,970, filed on Feb. 17, 2006, now Pat. No. 7,811,684.

(30) Foreign Application Priority Data

Feb. 18, 2005 (JP) .................... 2005-043003
Feb. 16, 2006 (JP) .................... 2006-039787

(51) Int. Cl.
*B05D 5/06* (2006.01)
(52) U.S. Cl. ..................................... 427/162
(58) Field of Classification Search .............. 427/162
See application file for complete search history.

(56) References Cited

U.S. PATENT DOCUMENTS

| 4,190,321 | A | | 2/1980 | Dorer et al. |
| 4,252,843 | A | * | 2/1981 | Dorer et al. ............ 427/162 |
| 5,116,644 | A | | 5/1992 | Asai et al. |
| 5,583,676 | A | | 12/1996 | Akiyama et al. |
| 5,948,481 | A | | 9/1999 | Yan et al. |
| 6,068,914 | A | | 5/2000 | Boire et al. |
| 6,174,599 | B1 | * | 1/2001 | Boire et al. ............ 428/336 |
| 6,726,814 | B2 | * | 4/2004 | Ohmi et al. ........... 204/192.26 |
| 6,791,649 | B1 | | 9/2004 | Nakamura et al. |

(Continued)

FOREIGN PATENT DOCUMENTS

EP 1 574 881 9/2005

(Continued)

OTHER PUBLICATIONS

Tadanaga et al, Super-Water-Repellent Al2O3 Coating Films with High Transparency, J. Amer. Ceram. Soc., 80, 4, 1997, p. 1040-1042.*

(Continued)

*Primary Examiner* — Timothy H Meeks
*Assistant Examiner* — Elizabeth Burkhart
(74) *Attorney, Agent, or Firm* — Fitzpatrick, Cella, Harper & Scinto

(57) ABSTRACT

It is an object to provide an optical transparent member capable of maintaining a high-performance antireflection effect for a base over a long period of time, and an optical system using the same, specifically an optical transparent member including on a base a layer containing $SiO_2$ as a main component, a layer containing $Al_2O_3$ as a main component, and a plate crystal layer formed from plate crystals containing $Al_2O_3$ as a main component, wherein the surface of the plate crystal layer has a shape of irregularities, and an optical system using the same.

5 Claims, 9 Drawing Sheets

U.S. PATENT DOCUMENTS

| | | |
|---|---|---|
| 2002/0037421 A1 | 3/2002 | Arnaud et al. |
| 2004/0005472 A1 | 1/2004 | Arnaud et al. |
| 2005/0233113 A1* | 10/2005 | Kotani et al. ............ 428/141 |

FOREIGN PATENT DOCUMENTS

| | | |
|---|---|---|
| GB | 1 462 618 | 1/1977 |
| JP | 50-70040 | 6/1975 |
| JP | 53-103754 | 9/1978 |
| JP | 60-88901 | 5/1985 |
| JP | 61-048124 | 10/1986 |
| JP | 1-308847 | 12/1989 |
| JP | 1-312501 | 12/1989 |
| JP | 2-245702 | 10/1990 |
| JP | 3-40243 | 2/1991 |
| JP | 05-027102 | 6/1991 |
| JP | 09-022668 | 1/1997 |
| JP | 09-202649 | 8/1997 |
| JP | 10-114543 | 5/1998 |
| JP | 03-135944 | 12/2000 |
| JP | 2001-017907 | 1/2001 |
| JP | 2001-188104 | 7/2001 |
| JP | 2002-086606 | 3/2002 |

OTHER PUBLICATIONS

Tadanaga et al. (J. Am. Ceram. Soc.) 80 (4) 1040-1042 (1997).
Translation of JP 10-114543.

* cited by examiner

OPTICAL TRANSPARENT MEMBER AND OPTICAL SYSTEM USING THE SAME

This application is a division of U.S. patent application Ser. No. 11/355,970, filed Feb. 17, 2006, now U.S. Pat. No. 7,811,684.

BACKGROUND OF THE INVENTION

1. Field of the Invention

The present invention relates to an optical transparent member having an antireflection performance and an optical system using the same, and more particularly to an optical transparent member suitable for obtaining a high antireflection performance from a visible region to a near infrared region over a long period of time, and an optical system using the same.

Particularly, the optical transparent member of the present invention can adapt to a transparent base having any refractive index, shows an excellent antireflection effect to visible light, and has a long-term weathering resistance, and therefore it can be used for optical members of various kinds of displays of word processors, computers, televisions, plasma display panels and the like; polarizing plates of liquid crystal apparatuses; sunglass lenses, graduated eyeglass lenses, finder lenses for cameras, prisms, fly-eye lenses, toric lenses, and various kinds of optical filters and sensors and the like consisting of various kinds of optical glass materials and transparent plastics; and further, optical members of various kinds of optical lenses of image pickup optical systems using those optical members, observation optical systems such as binoculars, projection optical systems for use in liquid crystal projectors, scan optical systems for use in laser printers and the like, covers of various kinds of instruments, and window glasses of automobiles, electric trains and the like.

2. Related Background Art

It is known that an antireflection structure using a fine periodic structure having a wavelength of the visible light region or a shorter wavelength forms a fine periodic structure having an appropriate pitch and height, and thereby shows an excellent antireflection performance in a wide wavelength region. As a method for forming a finely periodic structure, coating of a film in which fine particles having a particle diameter equal to or less than the wavelength are dispersed (Japanese Patent No. 03135944) or the like is known.

It is known that a method of forming a fine periodic structure by formation of a pattern by a fine processing apparatus (electron beam lithography apparatus, laser interference light exposure apparatus, semiconductor light exposure apparatus, etching apparatus, etc.) allows a pitch and a height to be controlled, and makes it possible to form a fine periodic structure having an excellent antireflection property (Japanese Patent Application Laid-Open No. S50-70040).

As methods other than the methods described above, methods of growing boehmite that is an oxide hydroxide of aluminum on a base to obtain an antireflection effect are known. In these methods, a layer of aluminum (alumina) formed by the vacuum film formation process (Japanese Patent Publication No. S61-48124) or the liquid phase process (sol-gel process) (Japanese Patent Application Laid-Open No. H9-202649) is subjected to a water vapor treatment or a hot water dipping treatment to form a surface layer into boehmite to form a fine periodic structure, and thereby an antireflection film is obtained.

However, in a technique using fine particles, it is difficult to control the pitch and height of the fine periodic structure, and if a height for obtaining a sufficient antireflection effect is to be obtained, the pitch increases to cause scattering, and conversely, the light transmittance decreases.

The method of forming fine patterns by the fine processing apparatus has a disadvantage that not only such a method of forming a pattern requires very large-scale equipment, thus requiring a very high capital expenditure, but also although the method is suitable for formation of a pattern on a flat surface, it is very difficult to form a pattern on a complicated shape such as a curved surface. In addition, the method is unsuitable for application to general-purpose optical elements because throughput is low and processing on a large area is difficult.

The method of growing boehmite on a base is convenient and has a high productivity, but alumina and boehmite are amphoteric compounds and thus are easily decomposed by acids and alkalis. Consequently, when alkali ions and the like of the base migrate to the surface and the surface is brought into an alkali atmosphere due to an exchange reaction with water in air, maintenance of a shape of irregularities becomes difficult due to decomposition of the surface and thus the performance is degraded. For a base having a refractive index significantly different from that of alumina, a difference in refractive index at an interface between the base and alumina is so large that the antireflection performance is not sufficiently exhibited.

SUMMARY OF THE INVENTION

The present invention has been made in view of the related art described above, and its object is to provide an optical transparent member which can maintain a high-performance antireflection effect over a long period of time for any base, and an optical system using the same.

The present invention provides an optical transparent member configured in a manner described below for achieving the above-mentioned object.

Namely, the present invention provides an optical transparent member having on a base a layer containing $SiO_2$ as a main component, a layer containing $Al_2O_3$ as a main component, and a plate crystal layer formed from plate crystals containing $Al_2O_3$ as a main component, wherein the surface of the plate crystal layer consists of a shape of irregularities.

It is preferable that on the base, the layer containing $SiO_2$ as a main component, the layer containing $Al_2O_3$ as a main component, and the plate crystal layer formed from plate crystals containing $Al_2O_3$ as a main component are stacked in this order.

It is preferable that the plate crystals of the plate crystal layer containing $Al_2O_3$ as a main component are arranged in a direction of 45° or more and 90° or less with respect to the layer containing $Al_2O_3$ as a main component.

It is preferable that the thickness of the shape of irregularities of the surface of the plate crystal layer is 20 nm or more and 1000 nm or less.

It is preferable that for the shape of irregularities of the surface of the plate crystal layer, an average surface roughness Ra' value obtained by two-dimensional extension of a center line average roughness of the surface with irregularities is 5 nm or more and 100 nm or less, and a surface area ratio $S_r = S/S_0$ (where $S_0$ represents the area when a measurement surface is ideally flat and S represents the surface area of an actual measurement surface) is 1.1 or more and 3.5 or less.

It is preferable that a refractive index $n_b$ of the base, a refractive index $n_s$ of the layer containing $SiO_2$ as a main component, and a refractive index $n_a$ of the layer containing $Al_2O_3$ as a main component meet the relation of $n_b \geq n_s \geq n_a$.

It is preferable that the thickness of the layer containing $SiO_2$ as a main component is 5 nm or more and 100 nm or less, and the thickness of the layer containing $Al_2O_3$ as a main component is 10 nm or more and 120 nm or less.

In addition, the present invention provides an optical system having the above-mentioned optical transparent member.

It is preferable that the optical system is an image pickup optical system, an observation optical system, a projection optical system or a scan optical system.

The optical transparent member of the present invention has a layer containing $SiO_2$ as a main component provided on a base and under a layer containing $Al_2O_3$ as a main component, and the refractive index $n_b$ of the base, the refractive index $n_s$ of the layer containing $SiO_2$ as a main component, and the refractive index $n_a$ of the layer containing $Al_2O_3$ as a main component meet the relation of $n_b \geq n_s \geq n_a$, thus making it possible to further improve a low reflection property of the plate crystal layer formed from plate crystals containing alumina as a main component.

Moreover, the layer containing $SiO_2$ as a main component inhibits migration of an alkali component and the like from the base to the surface, and can maintain an antireflection performance over a long period of time.

The optical member of the present invention has the surface of a base coated with a layer containing $SiO_2$ as a main component, a layer containing $Al_2O_3$ as a main component, and a plate crystal layer formed from plate crystals containing $Al_2O_3$ as a main component, in this order, and the outermost surface of the plate crystal layer has a shape of irregularities. The plate crystal layer formed from plate crystals forms a shape of irregularities due to arrangement in a direction of 45° or more and 90° or less with respect to the layer containing $Al_2O_3$ as a main component, the interval between plate surfaces in the layer, disorderliness of the orientation of the plate surface and disorderliness of the size of plate crystals, and the thickness of the layer is 20 nm or more and 1000 nm or less. For the density of the plate crystals, an average surface roughness value Ra' obtained by two-dimensional extension of a center line average roughness of the coating is 5 nm or greater, and a surface area ratio $S_r = S/S_0$ (where $S_0$ represents the surface area when a measurement surface is ideally flat and S represents the surface area of an actual measurement surface) is 1.1 or greater. The thickness of the layer having arranged plate crystals is 20 nm or more and 1000 nm or less.

The refractive index $n_b$ of the base, the refractive index $n_s$ of the layer containing $SiO_2$ as a main component, and the refractive index $n_a$ of the layer containing $Al_2O_3$ as a main component meet the relation of $n_b \geq n_s \geq n_a$, the thickness of the layer containing $SiO_2$ as a main component is 5 nm or more and 100 nm or less, and the thickness of the layer containing $Al_2O_3$ as a main component is 10 nm or more and 120 nm or less, whereby the refractive index is gradually reduced from the base to the shape of irregularities of the surface of the plate crystal layer formed from plate crystals, and the antireflection effect of the plate crystal layer is significantly improved.

The layer containing $SiO_2$ as a main component isolates the base containing various components and the layer having a high reactivity and containing $Al_2O_3$ as a main component from each other, and inhibits migration of a reactive components such as alkalis from the base to the layer containing $Al_2O_3$ as a main component is inhibited, thus making it possible to stably exhibit an antireflection effect over a long period of time.

As described above, the optical transparent member of the present invention can stably exhibit a high antireflection effect over a long period of time.

Other features and advantages of the present invention will be apparent from the following description taken in conjunction with the accompanying drawings.

DESCRIPTION OF THE PREFERRED EMBODIMENTS

The present invention will be described in detail below.

Figure 1:
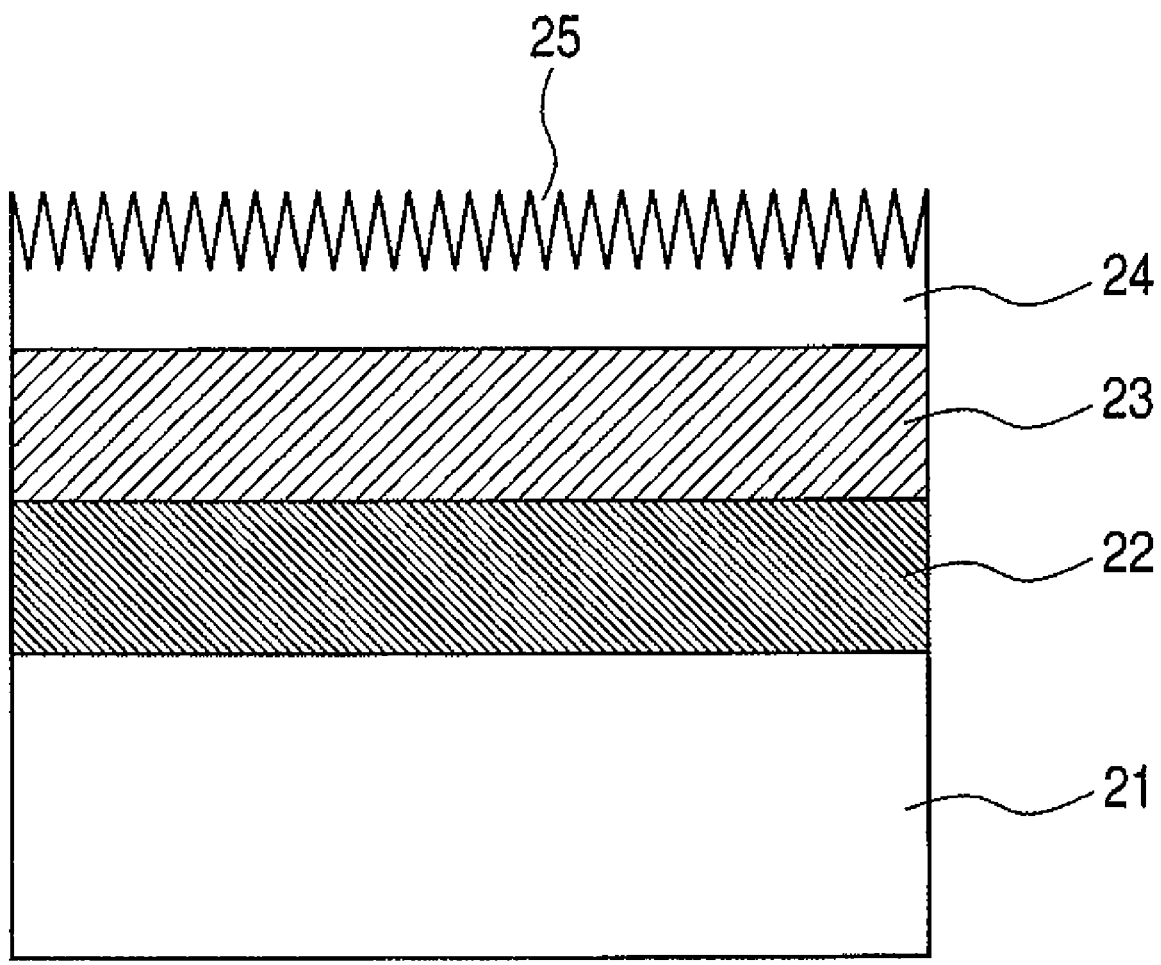
FIG. 1 is a schematic diagram showing one embodiment of an optical transparent member of the present invention.

FIG. 1 is a schematic diagram showing one embodiment of an optical transparent member of the present invention. In FIG. 1, the optical transparent member of the present invention has on a base 21a layer 22 containing $SiO_2$ as a main component, a layer 23 containing $Al_2O_3$ as a main component, and a plate crystal layer 24 formed from plate crystals containing $Al_2O_3$ as a main component, and the surface of the plate crystal layer 24 has a shape of irregularities 25.

The plate crystals containing $Al_2O_3$ (alumina) as a main component are formed by using an oxide or a hydroxide of aluminum or a hydrate thereof as a main component. Especially preferable crystals are boehmite. By placing these plate crystals, their end portions form fine irregularities, and therefore it is preferable that the plate crystals are selectively arranged in a direction of 45° or more and 90° or less with respect to the surface of a layer for increasing the height of the fine irregularities and reducing the intervals therebetween.

The thickness of the crystal layer formed from plate crystals is preferably 20 nm or more and 1000 nm or less, more preferably 50 nm or more and 1000 nm or less. If the thickness of the layer forming the irregularities is 20 nm or more and 1000 nm or less, an antireflection performance by a structure of fine irregularities is effective, the possibility that the mechanical strength of the irregularities is impaired is eliminated, and the structure of fine irregularities becomes advantageous in terms of production costs. More preferably, the thickness is 50 nm or more and 1000 nm or less, whereby the antireflection performance is further improved.

The surface density of the fine irregularities of the present invention is also important, and the corresponding average surface roughness Ra' value obtained by two-dimensional extension of a center line average roughness is 5 nm or greater, more preferably 10 nm or greater, further preferably 15 nm or more and 100 nm or less. The surface area ratio $S_r$ is 1.1, more preferably 1.15 or greater, further preferably 1.2 or more and 3.5 or less.

One of methods for evaluating an obtained structure of fine irregularities is observation of the surface of the structure of fine irregularities by a scanning probe microscope, and by the observation, the average surface roughness Ra' value obtained by two-dimensional extension of the center line average roughness Ra' of a layer and the surface area ratio $S_r$ are determined. Namely, the average surface roughness Ra' value (nm) is a value such that the center line average roughness Ra' defined in JIS B 0601 is applied to a measurement surface and three-dimensionally extended, and the Ra' value is expressed as a "value obtained by averaging absolute values of deviations from a reference surface to a specified surface" and given by the following formula (1).

$$Ra' = \frac{1}{S_0} \int_{Y_B}^{Y_T} \int_{X_L}^{X_R} |F(X, Y) - Z_0| d_X d_Y \quad (1)$$

Ra': average surface roughness value (nm),
$S_0$: area when the measurement surface is ideally flat, $|X_R - X_L| \times |Y_T - T_B|$,
F(X, Y): height at a measurement point (X, Y), where X is an X coordinate and Y is a Y coordinate,
$X_L$-$X_R$: range of X coordinates on the measurement surface,
$Y_B$-$Y_T$: range of Y coordinates on the measurement surface,
$Z_0$: average height within the measurement surface.

The surface area ratio $S_r$ is determined by $S_r = S/S_0$ ($S_0$: area when the measurement surface is ideally flat. S: surface area of an actual measurement surface). The surface area of an actual measurement surface is determined as follows. The measurement surface is divided into very small triangles consisting of closest three data points (A, B, C), and then the area ΔS of each very small triangle is determined using a vector product. ΔS (ΔABC) equals $[s(s-AB)(s-BC)(s-AC)]^{0.5}$ (where AB, BC and AC are the lengths of the sides, and S≡0.5 (AB+BC+AC) holds), and the total sum of the areas ΔS is a surface area S to be determined. If Ra' as the surface density of the fine irregularities is 5 nm or greater and $S_r$ is 1.1 or greater, antireflection by the structure of irregularities can be realized. If Ra' is 10 nm or greater and $S_r$ is 1.15 or greater, the antireflection effect becomes higher than that of the former case. If Ra' is 15 nm or greater and $S_r$ is 1.2 or greater, the structure of irregularities has a performance capable of enduring practical use. However, if Ra' is 100 nm or greater and $S_r$ is 3.5 or greater, the effect of scattering by the structure of irregularities predominates over the antireflection effect so that a sufficient antireflection performance cannot be obtained.

The layer containing $Al_2O_3$ as a main component may be any amorphous oxide coating containing $Al_2O_3$ as a main component, and as a different kind of component, an oxide such as $TiO_2$, $ZrO_2$, $SiO_2$, ZnO or MgO may be added alone, or two or more of these oxides may be selected, combined and added. Specifically, the layer is selected so that the relation of the refractive index $n_a$ of this film with the refractive index $n_s$ of the layer containing $SiO_2$ as a main component is $n_s \geq n_a$ as a result of controlling the contents of the components. In this case, a preferable mol % ratio to the film of $Al_2O_3$ is 50% or more and 100% or less, more preferably 70% or more and 100% or less. Consequently, the refractive index continuously decreases over a range from the base to an interface with air, and along with the effect of the layer having arranged plate crystals containing alumina as a main component, a high antireflection performance can be realized.

The layer of the present invention containing $SiO_2$ as a main component may be any amorphous oxide coating containing $SiO_2$ as a main component, and as a different kind of component, oxides such as $TiO_2$ and $ZrO_2$ may be added alone or in combination. Specifically, the layer is selected so that migration of an alkali and the like to the layer containing $Al_2O_3$ as a main component can be inhibited and the relation of the refractive index $n_s$ of this film with the refractive index $n_b$ of the base is $n_b \geq n_s$ as a result of controlling the contents of the components. In this case, a preferable mol % ratio to the film of $SiO_2$ is 40% or more and 100% or less, more preferably 60% or more and 100% or less. Consequently, the refractive index continuously decreases over a range from the base to an interface with air, and along with the effects of the plate crystal layer formed from plate crystals containing $Al_2O_3$ as a main component and the layer containing $Al_2O_3$ as a main component, a high antireflection performance can be realized. Furthermore, by adding an acid component such as phosphoric acid in addition to the above-mentioned oxides, the effect of inhibiting migration of an alkali and the like from the base to the layer containing $Al_2O_3$ as a main component can be improved.

The optical transparent member of the present invention can be formed by a publicly known gas phase process such as CVD or PVD, a liquid phase process such as a sol-gel process, hydrothermal synthesis using an inorganic salt, or the like. By such an approach, plate crystals consisting of plate crystals containing alumina as a main component can be provided directly after the layer containing $SiO_2$ as a main component and the layer containing $Al_2O_3$ as a main component are formed in order. Alternatively, after forming a layer of metal Al alone or a metal layer containing metal Al and any of metal Zn and metal Mg on the two layers of layers, the surface of the layer may be dissolved or precipitated by immersion in hot water at 50° C. or higher or exposure to water vapor to provide plate crystals of alumina. Alternatively, after forming a layer of $Al_2O_3$ alone or one or more oxide layer containing $Al_2O_3$ and any of $ZrO_2$, $SiO_2$, $TiO_2$, ZnO and MgO on the layer containing $SiO_2$ as a main component, the surface of the layer may be selectively dissolved or precipitated to provide plate crystals of alumina. Among them, preferable is a method in which a gel film formed by coating a sol-gel coating solution containing $SiO_2$ and a sol-gel coating solution containing $Al_2O_3$ in order is treated with hot water to grow alumina plate crystals.

For a raw material of the gel film obtained from a sol-gel coating solution containing $Al_2O_3$, an Al compound is used, or at least one of compounds of Zr, Si, Ti, Zn and Mg is used together with the Al compound. As raw materials of $Al_2O_3$, $ZrO_2$, $SiO_2$, $TiO_2$, ZnO and MgO, alkoxides of respective metals and salt compounds such as chlorides and nitrates may be used. Metal alkoxides are preferably used in terms of film formability particularly for $ZrO_2$, $SiO_2$ and $TiO_2$ raw materials.

Aluminum compounds include, for example, aluminum ethoxide, aluminum isopropoxide, aluminum-n-butoxide, aluminum-sec-butoxide, aluminum-tert-butoxide, aluminum acetylacetate or oligomers of these compounds, aluminum nitrate, aluminum chloride, aluminum acetate, aluminum phosphate, aluminum sulfate and aluminum hydroxide.

Specific examples of zirconium alkoxides include zirconium tetramethoxide, zirconium tetraethoxide, zirconium tetra n-propoxide, zirconium tetraisopropoxide, zirconium tetra n-butoxide and zirconium tetra t-butoxide.

For the silicon alkoxide, various kinds of compounds expressed by the general formula $Si(OR)_4$ may be used. R is a same or different lower alkyl group such as a methyl group, an ethyl group, a propyl group, an isopropyl group, a butyl group or an isobutyl group.

Titanium alkoxides include, for example, tetramethoxy titanium, tetraethoxy titanium, tetra n-propoxy titanium, tetraisopropoxy titanium, tetra n-butoxy titanium and tetraisobutoxy titanium.

Zinc compounds include, for example, zinc acetate, zinc chloride, zinc nitrate, zinc stearate, zinc oleate and zinc salicylate, and especially preferable are zinc acetate and zinc chloride.

Magnesium compounds include magnesium alkoxides such as dimethoxy magnesium, diethoxy magnesium, dipropoxy magnesium and dibutoxy magnesium, magnesium acetylacetate and magnesium chloride.

Organic solvents, which may be any organic solvents which do not cause raw materials such as the above-mentioned alkoxides to gelate, include, for example, alcohols such as methanol, ethanol, 2-propanol, butanol, ethylene glycol or ethylene glycol-mono-n-propyl ether; various kinds of aliphatic or alicyclic hydrocarbons such as n-hexane, n-octane, cyclohexane, cyclopentane and cyclooctane; various kinds of aromatic hydrocarbons such as toluene, xylene and ethyl benzene; various kinds of esters such as ethyl formate, ethyl acetate, n-butyl acetate, ethylene glycol monomethyl ether acetate, ethylene glycol monoethyl ether acetate and ethylene glycol monobuthyl ether acetate; various kinds of ketones such as acetone, methyl ethyl ketone, methyl isobutyl ketone and cyclohexanone; various kinds of ethers such as dimethoxy ethane, tetrahydrofuran, dioxane and diisopropyl ether; various kinds of chlorinated hydrocarbons such as chloroform, methylene chloride, carbon tetrachloride and tetrachloroethane; and aprotic polar solvents such as N-methylpyrolidone, dimethyl formamide, dimethyl acetamide and ethylene carbonate. Among various kinds of solvents described above, alcohols are preferably used in terms of stability of a solution.

If an alkoxide raw material is used, particularly alkoxides of aluminum, zirconium and titanium are highly reactive to water, and are abruptly hydrolyzed by addition of moisture in air or water, resulting in opacity and precipitation. Aluminum chloride compounds, zinc chloride compounds and magnesium chloride compounds are hard to be dissolved in an organic solvent alone, and the stability of their solutions is low. For prevention of such a situation, a stabilizer is preferably added to stabilize the solution.

Stabilizers may include, for example, β-diketone compounds such as acetyl acetone, dipyrobilemethane, trifluoroacetylacetone, hexafluoroacetylacetone, benzoylacetone and dibenzoylmethane; β-ketoester compounds such as methyl acetoacetate, ethyl acetoacetate, allyl ketoacetate, benzyl acetoacetate, acetoacetate-iso-propyl, acetoacetate-tert-butyl, acetoacetate-iso-butyl, acetoacetate-2-methoxyethyl and 3-keto-n-methyl valeriate; and alkanol amines such as monoethanol amine, diethanol amine and triethanol amine. The amount of stabilizer added is preferably 1 in terms of a molar ratio to the alkoxide or salt compound. After the stabilizer is added, a catalyst is preferably added for the purpose of promoting part of a reaction in order to form an appropriate precursor. Catalysts may include, for example, nitric acid, hydrochloric acid, sulfuric acid, phosphoric acid, acetic acid and ammonia.

For a raw material of the gel film obtained from a sol-gel coating solution containing $SiO_2$, a Si compound is used, or at least one of compounds of Ti and Zr is used together with the Si compound. As raw materials of $SiO_2$, $TiO_2$ and $ZrO_2$, alkoxides of respective metals and salt compounds such as chlorides and nitrates may be used, but metal alkoxides are preferably used in terms of film formability. For the metal alkoxide, the solvent, the stabilizer and the like, the aforementioned compounds may be used. As a catalyst promoting part of a reaction, an acid such as phosphoric acid is preferably used for trapping an alkali migrating in the film. The composition ratio of each component is appropriately selected using $SiO_2$ (n=1.45 by itself), $TiO_2$ (n=2.20 by itself) and $ZrO_2$ (n=1.90 by itself) so that the relation of the refractive index $n_s$ with the refractive index $n_b$ of the base and the refractive index $n_a$ of the layer containing $Al_2O_3$ as a main component is $n_b \geq n_s \geq n_a$. It is known that $TiO_2$ has a high refractive index and increases a control range of the refractive index of the film, while $TiO_2$ is caused to change from a non-crystal to an anatase crystal by a treatment of immersion in hot water or exposure to water vapor. In view of maintenance of homogeneity of a coating and the effect of inhibition of migration of an alkali and the like, the fraction of $TiO_2$ in the film is preferably reduced to inhibit crystallization into anatase, and the mol % ratio of $TiO_2$ in the film is preferably less than 40%. It is more preferably 30% or less.

As a method for forming a layer using the above-described sol-gel coating solution, for example, a know coating method such as a dipping method, a spin coating method, a spray method, a printing method, a flow coating method and a combination thereof may be appropriately employed. The film thickness can be controlled by changing a lifting speed in the dipping method, a substrate rotation speed in the spin coating method, or the like, and changing the concentration of a coating solution. Among them, the lifting speed in the dipping method may be appropriately selected according to a required film thickness, but it is preferable that after immersion, the film is lifted at a gentle uniform speed of, for example, about 0.1 to 3.0 mm/second. After coating of the layer, it may be dried at room temperature for about 30 minutes. The film can also be dried or thermally treated at a higher temperature, and the higher the thermal treatment temperature, the more easily the film is densificated. In the case of a gel film containing $Al_2O_3$ as a main component, a structure of large irregularities can be formed by increasing the thermal treatment temperature. In the case of a gel film containing $SiO_2$ as a main component, a capability of inhibiting migration of an alkali and the like can be improved by increasing the thermal treatment temperature.

Then, a gel film formed by coating a sol-gel coating solution containing $SiO_2$ and a sol-gel coating solution containing $Al_2O_3$ in order is immersed in hot water, whereby plate crystals containing $Al_2O_3$ as a main component is precipitated to form a shape of irregularities of the outermost surface. By immersion in hot water, the surface layer of the gel film formed by coating the sol-gel coating solution containing $Al_2O_3$ in order undergoes a peptization action or the like, and some components are eluted, but due to a difference in solubility in hot water between various kinds of hydroxides, plate crystals containing $Al_2O_3$ as a main component are precipitated on the surface layer of the gel film, and grow. The temperature of hot water is preferably 40° C. to 100° C. The hot water treatment time is about 5 minutes to about 24 hours.

For the hot water treatment of a gel film with oxides such as $TiO_2$, $ZrO_2$, $SiO_2$, ZnO and MgO as different kinds of components added to the film containing $Al_2O_3$ as a main component, crystallization is carried out using a difference in solubility in hot water between the components, and therefore unlike the hot water treatment of the single component film of $Al_2O_3$, the size of plate crystals can be controlled over a wide range by changing the composition of inorganic components. As a result, the shape of irregularities formed by plate crystals can be controlled over the wide range. Moreover, if ZnO is used as a subcomponent, coprecipitation with $Al_2O_3$ is possible, and therefore the refractive index can be controlled over a further wide range, thus making it possible to realize an excellent antireflection performance.

Thickness of the layer of the present invention containing $SiO_2$ as a main component is 5 nm or more and 100 nm or less, further preferably 5 nm or more and 80 nm or less. If the thickness is less than 5 nm, a sufficient effect against migration of an alkali cannot be obtained. If the thickness is greater than 100 nm, contribution to the reflection reducing effect is reduced due to interference and the like. The thickness of the layer containing $Al_2O_3$ as a main component is 10 nm or more and 120 nm or less, further preferably 10 nm or more and 100 nm or less. If the thickness is less than 10 nm, the adhesion property of plate crystals is degraded, and the gradient of a difference in refractive index between the layer containing $SiO_2$ as a main component and the plate crystal layer becomes so large that the optical performance is impaired. If the thickness is greater than 120 nm, contribution to the reflection reducing effect is reduced due to interference and the like.

Bases for use in the present invention include glass, resins, glass mirrors and mirrors made of resin. Typical examples of resin bases include films and molded products of thermoplastic resins such as polyester, triacetyl cellulose, cellulose acetate, polyethylene terephthalate, polypropylene, polystyrene, polycarbonate, polymethyl methacrylate, ABS resins, polyphenylene oxide, polyurethane, polyethylene and polyvinyl chloride; cross-linked films and cross-linked molded products obtained from various kinds of thermoset resins such as unsaturated polyester resins, phenol resins, cross-linked polyurethane, cross-linked acryl resins and cross-linked saturated polyester resins. Specific examples of glass may include no-alkali glass and alumina silicate glass. Bases for use in the present invention, which may be made of any materials capable of being formed into a shape appropriate to a use purpose ultimately, include flat plates, films and sheets, and may have a two-dimensional or three-dimensional curved surface. The thickness can be appropriately determined, and is generally 5 mm or less, but is not limited thereto.

The optical transparent member of the present invention may be further provided with a layer for imparting various kinds of functions, in addition to the layers described above. For example, a hard coat layer may be provided on the layer of plate crystals for improving the hardness of the film, or a water-repellent layer of fluoroalkyl silane or alkyl silane may be provided for imparting a water repellency. For the purpose of preventing deposition of contaminants, or the like, a layer of a material having a refractive index lower than that of plate crystals containing $Al_2O_3$ as a main component, or a layer consisting of an amphipathic compound may be provided. For improving the adhesion between the base and the layer containing $SiO_2$ as a main component, an adhesive layer or a primer layer may be used. The refractive index of other layers provided between the base and the layer containing $SiO_2$ as a main component is preferably an intermediate value between the refractive index of the base and the refractive index of the layer containing $SiO_2$ as a main component.

The present invention will be described specifically with examples. However, the present invention is not limited to such examples. Transparent films obtained with examples and comparative examples and having fine irregularities on the surface were evaluated by the methods described below.

(1) Observation of Shape of Coating

The surface of a surface layer of a coating was photographically observed (acceleration voltage; 10.0 kV, scaling factor; 30000) using a scanning electron microscope (FE-SEM, S4500 manufactured by Hitachi Ltd.). An average surface roughness Ra' value obtained by two-dimensional extension of the center line average roughness defined in JIS B 0601 and a surface area ratio Sr were determined using a scanning probe microscope (SPM, DFM mode, SPI3800 manufactured by Seiko Electronic Industries Co., Ltd.).

(2) Measurement of Transmittance

A transmittance was measured over a range from a visible region to a near-infrared region using an automatic optical element measuring apparatus (ART-25GD manufactured by JASCO). A disc glass plate was used. The angles of incidence of light in measurements of a transmittance and a reflectivity were 0° and 10°, respectively.

(3) Measurement of Film Refractive Index

Measurements were made over a range of wavelengths from 380 nm to 800 nm by Ellipsometer VASE manufactured by J.A. Woollam JAPAN Co., Inc.

Example 1

A clear float glass substrate (composition: soda lime silicate type, refractive index ng=1.52) having a size of about 100 mm×100 mm and a thickness of about 2 mm was ultrasonically washed with isopropyl alcohol, dried, and then used as a glass substrate for coating.

Tetraethoxy silane (TEOS) was dissolved in ethanol (EtOH), a 0.01 M aqueous phosphoric acid solution was added to the resultant solution as a catalyst, and then the resultant mixture was stirred for 6 hours. The molar ratio of the components at this time is TEOS:EtOH:$H_3PO_4$ aq=1:40:2. Titanium n-butoxide (TBOT) was dissolved in ethanol, ethyl acetoacetate (EAcAc) was then added to the resultant solution as a stabilizer, and the resultant mixture was stirred at room temperature for 3 hours. The molar ratio of the components is TBOT:EtOH:EAcAc=1:20:1. A $TiO_2$ sol solution was added to the aforementioned $SiO_2$ sol solution so that a molar ratio of $SiO_2$:$TiO_2$=95:5 was obtained, and the resultant mixture was stirred at room temperature for 2 hours, and then used as a $SiO_2$—$TiO_2$ coating solution. Then, the aforementioned coating glass substrate was immersed in this coating solution, a coating film was formed on the surface of the glass substrate by the dipping method (at a lifting speed of 0.5 mm/second, and at 20° C. and 56% R.H.). The glass substrate was dried, and then thermally treated by baking at 400° C. for an hour, and a transparent amorphous $SiO_2$/$TiO_2$ film was coated thereon.

The thickness and the refractive index of the obtained film were measured, and the result of the measurement showed that the thickness $d_s$ was $d_s$=20 nm and the refractive index was $n_s$=1.48.

Then, Al $(O-sec-Bu)_3$ was dissolved in IPA, EAcAc was added to the resultant solution as a stabilizer, and the resultant mixture was stirred at room temperature for about 3 hours. Thereafter, 0.01 M[HCl aq.] was added to the resultant solution, and the resultant mixture was stirred at room temperature for about 3 hours to prepare an $Al_2O_3$ sol solution. Here, the molar ratio of the solution was $Al(O-sec-Bu)_3$:IPA: EAcAc:HClaq.=1:20:1:1. The aforementioned coating substrate was immersed in the coating solution, and then a coating film was formed on the surface of the glass substrate by the dipping method (at a lifting speed of 2 mm/second, and at 20° C. and 56% R.H.). The glass substrate was dried, and then thermally treated by baking at 400° C. for an hour, and a transparent amorphous $Al_2O_3$ film was coated thereon. Then, the glass substrate was immersed in hot water at 100° C. for 30 minutes, and then dried at 100° C. for 10 minutes.

Figure 2:
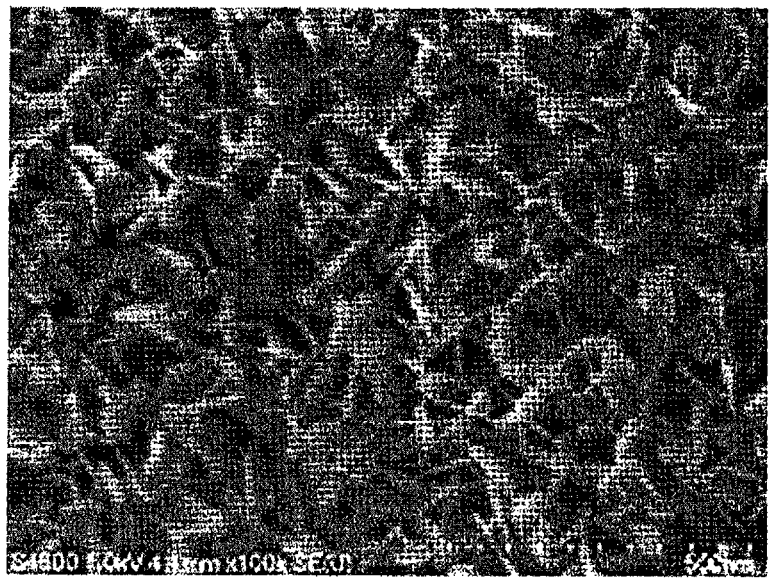
FIG. 2 is a photograph (scaling factor: ×100000) showing a result of observation of a layer formed on a glass substrate and having fine irregularities on the surface from the top surface by an FE-SEM in Example 1.
Figure 3:
FIG. 3 is a photograph (scaling factor: ×150000) showing a result of observation of the cross-section of a layer formed on a glass substrate and having fine irregularities by an FE-SEM in Example 1.

The surface of the obtained film was observed by the FE-SEM to find a structure of fine irregularities in which plate crystals containing $Al_2O_3$ as a main component were tangled at random and in a complicated manner as shown in FIG. 2. The cross-section was observed by the FE-SEM to observe an image in which plate crystals containing $Al_2O_3$ as a main component were arranged selectively in a direction vertical to the surface of the layer as shown in FIG. 3. The undermost layer in FIG. 3 is a glass cross-section of the substrate, the intermediate layer is a layer consisting of the layer containing $SiO_2$ as a main component and the layer containing $Al_2O_3$ as a main component, and the uppermost layer is a plate crystal layer consisting of plate crystals. The surface was measured by the SPM, and the result of the measurement showed that the average surface roughness Ra' value (nm) was Ra'=28 nm and the surface area ratio $S_r$ was $S_r$=1.9.

Then, for the obtained film, the film thickness and the refractive index were measured using ellipsometry. The thickness and the refractive index of each film are shown in Table 1.

For this substrate, a high-temperature and high-humidity test at a temperature of 60° C. and a humidity of 90% was conducted as an accelerated test for examination on durability of an optical performance, and the transmittance was measured at a start time, after 250 hours and after 500 hours. The results thereof are shown in Table 1.

Example 2

An S-TIH53 glass substrate (manufactured by OHARA INC., refractive index n=1.84) having a size of about 50 mm×50 mm and a thickness of about 1 mm was ultrasonically washed with isopropyl alcohol, dried, and then used as a glass substrate for coating.

A $TiO_2$ sol solution was added to the aforementioned $SiO_2$ sol solution so that a molar ratio of $SiO_2$:$TiO_2$=7:3 was obtained, and the resultant mixture was stirred at room temperature for 2 hours, and then used as a $SiO_2$—$TiO_2$ coating solution as in Example 1. Then, the aforementioned coating glass substrate was immersed in this coating solution, a coating film was formed on the surface of the glass substrate by the dipping method (at a lifting speed of 0.5 mm/second, and at 20° C. and 56% R.H.). The glass substrate was dried, and then thermally treated by baking at 400° C. for an hour, and a transparent amorphous $SiO_2$/$TiO_2$ film was coated thereon. The thickness and the refractive index of the obtained film were measured, and the result of the measurement showed that the thickness was 28 nm and the refractive index $n_s$ was 1.67.

Then, the aforementioned coating substrate was immersed in the $Al_2O_3$ coating solution as in Example 1, and then a coating film was formed on the surface of the glass substrate by the dipping method (at a lifting speed of 2 mm/second, and at 20° C. and 56% R.H.). The glass substrate was dried, and then thermally treated by baking at 400° C. for an hour, and a transparent amorphous $Al_2O_3$ film was coated thereon. Then, the glass substrate was immersed in hot water at 100° C. for 30 minutes, and then dried at 100° C. for 10 minutes.

The surface of the obtained film was observed by the FE-SEM to find a structure of fine irregularities in which plate crystals containing $Al_2O_3$ as a main component were tangled at random and complicatedly as in Example 1. For observation of the cross-section by the FE-SEM, a structure almost same as that in Example 1 was observed. The result of measurement by the SPM showed that the average surface roughness Ra' value (nm) was Ra'=27 nm and the surface area ratio $S_r$ was $S_r$=1.9.

Then, for the obtained film, the film thickness and the refractive index were measured using ellipsometry. The thickness and the refractive index of each film are shown in Table 1.

For this substrate, a high-temperature and high-humidity test at a temperature of 60° C. and a humidity of 90% was conducted, and the transmittance was measured at a start time, after 250 hours and after 500 hours. The results thereof are shown in Table 1.

Example 3

An S-TIH53 substrate (manufactured by OHARA INC., refractive index $n_b$=1.84) same as that in Example 2 was used as a glass substrate for coating.

$SiO_2$/$TiO_2$ (7/3) was coated, and then a transparent amorphous $SiO_2$/$TiO_2$ film was formed in the same manner as in Example 2. The thickness and the refractive index of the obtained film were measured, and the result of the measurement showed that the thickness was 28 nm and the refractive index was $n_s$=1.67.

Aluminum-sec-butoxide [$Al(O-sec-Bu)_3$] was dissolved in 2-propanol [IPA], ethyl acetoacetate [EAcAc] was added to the resultant solution as a stabilizer, and the resultant mixture was stirred at room temperature for about 3 hours to prepare an $Al_2O_3$ sol solution. Here, the molar ratio of the solution was $Al(O-sec-Bu)_3$:IPA:EAcAc=1:20:1. Titanium-n-butoxide [$Ti(O-n-Bu)_4$] was also dissolved in IPA, EAcAc was added to the resultant solution, and the resultant mixture was stirred for about 3 hours to prepare a $TiO_2$ sol solution. The molar ratio of the solution was $Ti(O-n-Bu)_4$:IPA:EAcAc=1:20:1. This $TiO_2$ sol solution was added in the aforementioned $Al_2O_3$ sol solution so that a weight ratio of $Al_2O_3$:$TiO_2$=8:2 was obtained, the resultant mixture was stirred for about 30 minutes, 0.01 M[$HCl_{aq.}$] was then added to the mixture, and the resultant mixture was stirred at room temperature for about 3 hours. In this way, a coating solution being an $Al_2O_3$/$TiO_2$ sol was prepared. Here, the amount of $HCl_{aq.}$ added was an amount twice as large as the amounts of $Al(O-sec-Bu)_3$ and $Ti(O-n-Bu)_4$ in terms of a molar ratio.

Then, the aforementioned coating substrate was immersed in the $Al_2O_3$/$TiO_2$ coating solution as in Example 1, and then a coating film was formed on the surface of the glass substrate by the dipping method (at a lifting speed of 1 mm/second, and at 20° C. and 56% R.H.). The glass substrate was dried, and then thermally treated by baking at 400° C. for an hour, and a transparent amorphous $Al_2O_3$/$TiO_2$ film was coated thereon. Then, the glass substrate was immersed in hot water at 100° C. for 30 minutes, and then dried at 100° C. for 10 minutes.

The surface of the obtained film was observed by the FE-SEM to find a structure of fine irregularities in which plate crystals containing $Al_2O_3$ as a main component were tangled at random and complicatedly as in Example 1. For observation of the cross-section by the FE-SEM, a structure almost same as that in Example 1 was observed. The result of measurement by the SPM showed that the average surface roughness Ra' value (nm) was Ra'=18 nm and the surface area ratio $S_r$ was $S_r$=1.5.

Then, for the obtained film, the film thickness and the refractive index were measured using ellipsometry. The thickness and the refractive index of each film are shown in Table 1.

For this substrate, a high-temperature and high-humidity test at a temperature of 60° C. and a humidity of 90% was conducted, and the transmittance was measured at a start time, after 250 hours and after 500 hours. The results thereof are shown in Table 1.

Example 4

An S-TIH53 substrate (manufactured by OHARA INC., refractive index $n_b$=1.84) same as that in Example 2 was used as a glass substrate for coating.

$SiO_2/TiO_2$ (7/3) was coated, and then a transparent amorphous $SiO_2/TiO_2$ film was formed in the same manner as in Example 2. The thickness and the refractive index of the obtained film were measured, and the result of the measurement showed that the thickness was 28 nm and the refractive index was $n_s$=1.67.

Aluminum-sec-butoxide [Al(O-sec-Bu)$_3$] was dissolved in 2-propanol [IPA], ethyl acetoacetate [EAcAc] was added to the resultant solution as a stabilizer, and the resultant mixture was stirred at room temperature for about 3 hours to prepare an $Al_2O_3$ sol solution. Here, the molar ratio of the solution was Al(o-sec-Bu)$_3$:IPA:EAcAc=1:20:0.5. Zinc acetate dihydrate [Zn(CH$_3$COO)$_2$.2H$_2$O] was also dissolved in [IPA], monoethanol amine [MEA] was added to the resultant solution, and the resultant mixture was stirred for about 3 hours to prepare a ZnO solution. The molar ratio of the solution was Zn(CH$_3$COO)$_2$.2H$_2$O:IPA:MEA=1:10:1. This ZnO sol solution was added in the aforementioned $Al_2O_3$ sol solution so that a weight ratio of $Al_2O_3$:ZnO=0.8:0.2 was obtained, and the resultant mixture was stirred for about 30 hours. In this way, a coating solution being an $Al_2O_3$—ZnO sol was prepared.

Then, the aforementioned coating substrate was immersed in the $Al_2O_3$/ZnO coating solution as in Example 1, and then a coating film was formed on the surface of the glass substrate by the dipping method (at a lifting speed of 2 mm/second, and at 20° C. and 56% R.H.). The glass substrate was dried, and then thermally treated by baking at 400° C. for an hour, and a transparent amorphous $Al_2O_3$/ZnO film was coated thereon. Then, the glass substrate was immersed in hot water at 100° C. for 30 minutes, and then dried at 100° C. for 10 minutes.

The surface of the obtained film was observed by the FE-SEM to find a structure of fine irregularities in which plate crystals containing $Al_2O_3$ as a main component were tangled at random and complicatedly as in Example 1. For observation of the cross-section by the FE-SEM, a structure almost same as that in Example 1 was observed. The result of measurement by the SPM showed that the average surface roughness Ra' value (nm) was Ra'=32 nm and the surface area ratio $S_r$ was $S_r$=2.0.

Then, for the obtained film, the film thickness and the refractive index were measured using ellipsometry. The thickness and the refractive index of each film are shown in Table 1.

For this substrate, a high-temperature and high-humidity test at a temperature of 60° C. and a humidity of 90% was conducted, and the transmittance was measured at a start time, after 250 hours and after 500 hours. The results thereof are shown in Table 1.

Example 5

An S-TIH1 glass substrate (manufactured by OHARA INC., refractive index $n_b$=1.71) having a size of about 50 mm×50 mm and a thickness of about 1 mm was used as a glass substrate for coating.

Zirconium n-butoxide (ZBOT) was dissolved in ethanol, ethyl acetoacetate (EAcAc) was then added to the resultant solution as a stabilizer, and the resultant mixture was stirred at room temperature for 3 hours. The molar ratio of the components was ZBOT:EtOH:EAcAc=1:20:1. As in Example 1, a $TiO_2$ sol solution and then a $ZrO_2$ sol solution were added to a $SiO_2$ sol solution so that a molar ratio of $SiO_2$:$TiO_2$:$ZrO_2$=7:1:2 was obtained, and the resultant mixture was stirred at room temperature for 2 hours, and then used as a $SiO_2$—$TiO_2$—$ZrO_2$ coating solution. Then, the aforementioned coating glass substrate was immersed in this coating solution, and a coating film was formed on the surface of the glass substrate by the dipping method (at a lifting speed of 0.5 mm/second, and at 20° C. and 56% R.H.). The glass substrate was dried, and then thermally treated by baking at 400° C. for an hour, and a transparent amorphous $SiO_2/TiO_2/ZrO_2$ film was coated thereon. The thickness and the refractive index of the obtained film were measured, and the result of the measurement showed that the thickness was 25 nm and the refractive index was $n_s$=1.62.

Aluminum-sec-butoxide [Al(O-sec-Bu)$_3$] was dissolved in 2-propanol [IPA], ethyl acetoacetate [EAcAc] was added to the resultant solution as a stabilizer, and the resultant mixture was stirred at room temperature for about 3 hours to prepare an $Al_2O_3$ sol solution. Here, the molar ratio of the solution was Al(O-sec-Bu)$_3$:IPA:EAcAc=1:20:0.5. Zinc acetate dihydrate [Zn(CH$_3$COO)$_2$.2H$_2$O] was also dissolved in [IPA], monoethanol amine [MEA] was added to the resultant solution, and the resultant mixture was stirred for about 3 hours to prepare a ZnO solution. The molar ratio of the solution was Zn(CH$_3$COO)$_2$.2H$_2$O:IPA:MEA=1:10:1. This ZnO sol solution was added in the aforementioned $Al_2O_3$ sol solution so that a weight ratio of $Al_2O_3$:ZnO=0.9:0.1 was obtained, and the resultant mixture was stirred for about 3 hours. In this way, a coating solution being an $Al_2O_3$—ZnO sol was prepared.

Then, the aforementioned coating substrate was immersed in the $Al_2O_3$/ZnO coating solution as in Example 1, and then a coating film was formed on the surface of the glass substrate by the dipping method (at a lifting speed of 1 mm/second, and at 20° C. and 56% R.H.). The glass substrate was dried, and then thermally treated by baking at 400° C. for an hour, and a transparent amorphous $Al_2O_3$/ZnO film was coated thereon. Then, the glass substrate was immersed in hot water at 100° C. for 30 minutes, and then dried at 100° C. for 10 minutes.

The surface of the obtained film was observed by the FE-SEM to find a structure of fine irregularities in which plate crystals containing $Al_2O_3$ as a main component were tangled at random and in a complicated manner as in Example 1. For observation of the cross-section by the FE-SEM, a structure almost same as that in Example 1 was observed. The result of measurement by the SPM showed that the average surface roughness Ra' value (nm) was Ra'=30 nm and the surface area ratio $S_r$ was $S_r$=1.9.

Then, for the obtained film, the film thickness and the refractive index were measured using ellipsometry. The thickness and the refractive index of each film are shown in Table 1.

For this substrate, a high-temperature and high-humidity test at a temperature of 60° C. and a humidity of 90% was conducted, and the transmittance was measured at a start time, after 250 hours and after 500 hours. The results thereof are shown in Table 1.

Example 6

For a substrate same as that in Example 5, the S-TIH1 substrate manufactured by OHARA INC. (refractive index n=1.71) was used as a glass substrate for coating, the $SiO_2$—$TiO_2$ coating solution used in Example 2 was coated, and then a transparent amorphous $SiO_2/TiO_2$ film was formed. The thickness and the refractive index of the obtained film were measured, and the result of the measurement showed that the thickness was 28 nm and the refractive index was n=1.67. Then, the glass substrate was immersed in the $Al_2O_3/ZnO$ used in Example 4, and then a coating film was formed on the surface of the glass substrate at a lifting speed of 1 mm/second. The glass substrate was dried, and then thermally treated by baking at 400° C. for an hour, and a transparent amorphous $Al_2O_3/ZnO$ film was coated thereon. The glass substrate was further immersed in the $Al_2O_3$ coating solution used in Example 1, and then a coating film was formed at a lifting speed of 1 mm/second. The glass substrate was dried, and then thermally treated by baking at 400° C. for an hour, and a transparent amorphous $Al_2O_3$ film was coated thereon. Then, the glass substrate was immersed in hot water at 100° C. for 30 minutes, and then dried at 100° C. for 10 minutes.

The surface of the obtained film was observed by the FE-SEM to find a structure of fine irregularities in which plate crystals containing $Al_2O_3$ as a main component were tangled at random and complicatedly as in Example 1. For observation of the cross-section by the FE-SEM, a structure almost same as that in Example 1 was observed. The result of measurement by the SPM showed that the average surface roughness Ra' value (nm) was Ra'=23 nm and the surface area ratio $S_r$ was $S_r$=1.7.

Then, for the obtained film, the film thickness and the refractive index were measured using ellipsometry. The thickness and the refractive index of each film are shown in Table 1.

For this substrate, a high-temperature and high-humidity test at a temperature of 60° C. and a humidity of 90% was conducted, and the transmittance was measured at a start time, after 250 hours and after 500 hours. The results thereof are shown in Table 1.

Example 7

On the clear float glass substrate used in Example 1, a $SiO_2$ film was formed in a thickness of 30 nm using a magnetron sputtering apparatus. The refractive index of the film was 1.45. Then, the glass substrate was immersed in the $Al_2O_3$ coating solution used in Example 1, and then a coating film was formed at a lifting speed of 2 mm/second. The glass substrate was dried, and then thermally treated by baking at 400° C. for an hour, and a transparent amorphous $Al_2O_3$ film was coated thereon. Then, the glass substrate was immersed in hot water at 100° C. for 30 minutes, and then dried at 100° C. for 10 minutes.

The surface of the obtained film was observed by the FE-SEM to find a structure of fine irregularities in which plate crystals containing $Al_2O_3$ as a main component were tangled at random and in a complicated manner as in Example 1. For observation of the cross-section by the FE-SEM, a structure almost same as that in Example 1 was observed. The result of measurement by the SPM showed that the average surface roughness Ra' value (nm) was Ra'=22 nm and the surface area ratio $S_r$ was $S_r$=1.6.

Then, for the obtained film, the film thickness and the refractive index were measured using ellipsometry. The thickness and the refractive index of each film are shown in Table 1.

For this substrate, a high-temperature and high-humidity test at a temperature of 60° C. and a humidity of 90% was conducted, and the transmittance was measured at a start time, after 250 hours and after 500 hours. The results thereof are shown in Table 1.

Example 8

On the clear float glass substrate used in Example 1, a $SiO_2$ film was formed in a thickness of 30 nm using a magnetron sputtering apparatus. The refractive index of the film was 1.45. Then, an Al metal film was coated in a thickness of 35 nm by magnetron sputtering. Then, the glass substrate was immersed in hot water at 100° C. for 30 minutes. A metallic luster of Al disappeared within several minutes after immersion, and a transparent film was left on the surface layer after lifting. Thereafter, the glass substrate was dried at 100° C. for 10 minutes.

The surface of the obtained film was observed by the FE-SEM to find a structure of fine irregularities in which plate crystals containing $Al_2O_3$ as a main component were tangled at random and in a complicated manner as in Example 1. For observation of the cross-section by the FE-SEM, a structure almost same as that in Example 1 was observed. The result of measurement by the SPM showed that the average surface roughness Ra' value (nm) was Ra'=57 nm and the surface area ratio Sr was Sr=2.6.

Then, for the obtained film, the film thickness and the refractive index were measured using ellipsometry. The thickness and the refractive index of each film are shown in Table 1.

For this substrate, a high-temperature and high-humidity test at a temperature of 60° C. and a humidity of 90% was conducted, and the transmittance was measured at a start time, after 250 hours and after 500 hours. The results thereof are shown in Table 1.

Example 9

On the TIH53 substrate used in Example 2, a composite transparent oxide film in which a composition ratio of $SiO_2$ to $ZrO_2$ was 7:3 was formed in a thickness of 40 nm using a dual magnetron sputtering apparatus. The refractive index of the film was 1.65. Then, a film having $Al_2O_3$ and ZnO in a composition ratio of 8:2 was formed in a thickness of 50 nm by dual sputtering. An Al metal film was coated in a thickness of 25 nm by magnetron sputtering. Then, the glass substrate was immersed in hot water at 100° C. for 30 minutes. A metallic luster of Al disappeared within several minutes after immersion, and a transparent film was left on the surface layer after lifting. Thereafter, the glass substrate was dried at 100° C. for 10 minutes.

The surface of the obtained film was observed by the FE-SEM to find a structure of fine irregularities in which plate crystals containing $Al_2O_3$ as a main component were tangled at random and in a complicated manner as in Example 1. For observation of the cross-section by the FE-SEM, a structure almost same as that in Example 1 was observed. The result of measurement by the SPM showed that the average surface roughness Ra' value (nm) was Ra'=42 nm and the surface area ratio $S_r$ was $S_r$=2.2.

Then, for the obtained film, the film thickness and the refractive index were measured using ellipsometry. The thickness and the refractive index of each film are shown in Table 1.

For this substrate, a high-temperature and high-humidity test at a temperature of 60° C. and a humidity of 90% was conducted, and the transmittance was measured at a start time, after 250 hours and after 500 hours. The results thereof are shown in Table 1.

Example 10

On the TIH01 substrate used in Example 5, a composite transparent oxide film in which a composition ratio of $SiO_2$ to $ZrO_2$ was 8:2 was formed in a thickness of 40 nm using a dual magnetron sputtering apparatus. The refractive index of the film was 1.61. Then, a film having $Al_2O_3$ and ZnO in a composition ratio of 9:1 was formed in a thickness of 50 nm by dual sputtering. An Al metal film was coated in a thickness of 200 nm by magnetron sputtering. Then, the glass substrate was immersed in hot water at 100° C. for 30 minutes. A metallic luster of Al disappeared within several minutes after immersion, and a transparent film was left on the surface layer after lifting. Thereafter, the glass substrate was dried at 100° C. for 10 minutes.

The surface of the obtained film was observed by the FE-SEM to find a structure of fine irregularities in which plate crystals containing $Al_2O_3$ as a main component were tangled at random and complicatedly as in Example 1. For observation of the cross-section by the FE-SEM, a structure almost same as that in Example 1 was observed. The result of measurement by the SPM showed that the average surface roughness Ra' value (nm) was Ra'=45 nm and the surface area ratio $S_r$ was $S_r$=2.3.

Then, for the obtained film, the film thickness and the refractive index were measured using ellipsometry. The thickness and the refractive index of each film are shown in Table 1.

For this substrate, a high-temperature and high-humidity test at a temperature of 60° C. and a humidity of 90% was conducted, and the transmittance was measured at a start time, after 250 hours and after 500 hours. The results thereof are shown in Table 1.

Comparative Example 1

The clear float glass substrate used in Example 1 was immersed in the $Al_2O_3$ sol solution used in Example 1, and then a coating film was formed on the surface of the glass substrate by the dipping method (at a lifting speed of 2 mm/second, and at 20° C. and 56% R.H.). The glass substrate was dried, and then baked at 400° C. for an hour, and a transparent amorphous $Al_2O_3$ film was coated thereon. Then, the glass substrate was immersed in hot water at 100° C. for 30 minutes, and then dried at 100° C. for 10 minutes.

The surface of the obtained film was observed by the FE-SEM to find a structure of fine irregularities in which plate crystals containing $Al_2O_3$ as a main component were tangled at random and in a complicated manner as in Example 1. The result of measurement by the SPM showed that the average surface roughness Ra' value (nm) was Ra'=28 nm and the surface area ratio Sr was Sr=1.9.

Then, for the obtained film, the film thickness and the refractive index were measured using ellipsometry. The thickness and the refractive index of each film are shown in Table 1.

For this substrate, a high-temperature and high-humidity test at a temperature of 60° C. and a humidity of 90% was conducted, and the transmittance was measured at a start time, after 250 hours and after 500 hours. The results thereof are shown in Table 1.

Comparative Example 2

The S-TIH53 substrate (refractive index n=1.84) used in Example 2 was immersed in the $Al_2O_3/TiO_2$ sol solution used in Example 3, and then a coating film was formed on the surface of the glass substrate by the dipping method (at a lifting speed of 1 mm/second, and at 20° C. and 56% R.H.). The glass substrate was dried, and then baked at 400° C. for an hour, and a transparent amorphous $Al_2O_3/TiO_2$ film was coated thereon. Then, the glass substrate was immersed in hot water at 100° C. for 30 minutes, and then dried at 100° C. for 10 minutes.

The surface of the obtained film was observed by the FE-SEM to find a structure of fine irregularities in which plate crystals containing $Al_2O_3$ as a main component were tangled at random and in a complicated manner as in Example 1. The result of measurement by the SPM showed that the average surface roughness Ra' value (nm) was Ra'=18 nm and the surface area ratio Sr was Sr=1.5.

Then, for the obtained film, the film thickness and the refractive index were measured using ellipsometry. The thickness and the refractive index of each film are shown in Table 1.

For this substrate, a high-temperature and high-humidity test at a temperature of 60° C. and a humidity of 90% was conducted, and the transmittance was measured at a start time, after 250 hours and after 500 hours. The results thereof are shown in Table 1.

Comparative Example 3

The clear float glass substrate (composition: soda lime silicate type, refractive index n=1.52) used in Example 1 was ultrasonically washed with isopropyl alcohol, dried, and then used as a glass substrate for coating.

A $TiO_2$ sol solution was added to the aforementioned $SiO_2$ sol solution so that a molar ratio of $SiO_2:TiO_2$=3:7 was obtained, and the resultant mixture was stirred at room temperature for 2 hours, and then used as a $SiO_2$—$TiO_2$ coating solution as in Example 1. Then, the aforementioned coating glass substrate was immersed in this coating solution, a coating film was formed on the surface of the glass substrate by the dipping method (at a lifting speed of 0.5 mm/second, and at 20° C. and 56% R.H.). The glass substrate was dried, and then thermally treated by baking at 400° C. for an hour, and a transparent amorphous $SiO_2/TiO_2$ film was coated thereon.

The thickness and the refractive index of the obtained film were measured, and the result of the measurement showed that the thickness was 28 nm and the refractive index $n_s$ was 2.05.

Then, the glass substrate was immersed in the $Al_2O_3$ sol solution used in Example 1, and then a coating film was formed on the surface of the glass substrate by the dipping method (at a lifting speed of 2 mm/second, and at 20° C. and 56% R.H.). The glass substrate was dried, and then baked at 400° C. for an hour, and a transparent amorphous $Al_2O_3$ film was coated thereon. Then, the glass substrate was immersed in hot water at 100° C. for 30 minutes, and then dried at 100° C. for 10 minutes.

The surface of the obtained film was observed by the FE-SEM to find a structure of fine irregularities in which plate crystals containing $Al_2O_3$ as a main component were tangled at random and in a complicated manner as in Example 1. The result of measurement by the SPM showed that the average surface roughness Ra' value (nm) was Ra'=28 nm and the surface area ratio Sr was Sr=1.9.

Then, for the obtained film, the film thickness and the refractive index were measured using ellipsometry. The thickness and the refractive index of each film are shown in Table 1.

For this substrate, a high-temperature and high-humidity test at a temperature of 60° C. and a humidity of 90% was conducted, and the transmittance was measured at a start time, after 250 hours and after 500 hours. The results thereof are shown in Table 1.

[Table 1]

TABLE 1

| | Base Refractive index $n_b$ | Film containing $SiO_2$ as a main component | | Film containing $Al_2O_3$ as a main component | | Crystal layer of plate crystals containing $Al_2O_3$ as a main component | | Results of measurements of transmittance (550 nm) High-temperature and high-humidity test | | |
|---|---|---|---|---|---|---|---|---|---|---|
| | | Thickness (nm) | Refractive index $n_a$ | Thickness (nm) | Refractive index $n_a$ | Thickness (nm) | Refractive index | Start time | 250 hours | 500 hours |
| Example 1 | 1.52 | 20 | 1.48 | 100 | 1.42 | 230 | 1.42-1.0 | 99.6 | 99.6 | 99.5 |
| Example 2 | 1.84 | 28 | 1.67 | 100 | 1.42 | 220 | 1.42-1.0 | 99.3 | 99.2 | 99.2 |
| Example 3 | 1.84 | 28 | 1.67 | 30 | 1.60 | 180 | 1.42-1.0 | 99.2 | 99.2 | 99.1 |
| Example 4 | 1.84 | 28 | 1.67 | 80 | 1.55 | 300 | 1.53-1.0 | 99.5 | 99.5 | 99.3 |
| Example 5 | 1.71 | 25 | 1.62 | 80 | 1.50 | 300 | 1.49-1.0 | 99.4 | 99.4 | 99.4 |
| Example 6 | 1.71 | 28 | 1.67 | 90 | 1.58 | 200 | 1.42-1.0 | 99.6 | 99.6 | 99.5 |
| Example 7 | 1.52 | 30 | 1.45 | 100 | 1.42 | 250 | 1.42-1.0 | 99.3 | 99.3 | 99.3 |
| Example 8 | 1.52 | 30 | 1.45 | 30 | 1.42 | 500 | 1.42-1.0 | 99.8 | 99.8 | 99.6 |
| Example 9 | 1.84 | 40 | 1.65 | 40 | 1.58 | 400 | 1.54-1.0 | 99.4 | 99.3 | 99.3 |
| Example 10 | 1.71 | 40 | 1.6 | 30 | 1.54 | 420 | 1.51-1.0 | 99.5 | 99.5 | 99.4 |
| Comparative Example 1 | 1.52 | — | — | 100 | 1.42 | 230 | 1.42-1.0 | 99.4 | 98.0 | 93.5 |
| Comparative Example 2 | 1.84 | — | — | 30 | 1.60 | 180 | 1.42-10 | 97.2 | 93.8 | 89.6 |
| Comparative Example 3 | 1.52 | 28 | 2.05 | 100 | 1.42 | 230 | 1.42-1.0 | 93.8 | 92.1 | 87.8 |
| Comparative Example 4 | 1.52 | — | — | 30 | 1.42 | 380 | 1.42-10 | 99.6 | 95.0 | 91.6 |

Then, for the obtained film, the film thickness and the refractive index were measured using ellipsometry. The thickness and the refractive index of each film are shown in Table 1.

For this substrate, a high-temperature and high-humidity test at a temperature of 60° C. and a humidity of 90% was conducted, and the transmittance was measured at a start time, after 250 hours and after 500 hours. The results thereof are shown in Table 1.

Comparative Example 4

On the clear float glass substrate used in Example 1, an Al metal film was coated in a thickness of 25 nm by magnetron sputtering. Then, the glass substrate was immersed in hot water at 100° C. for 30 minutes. A metal luster of Al disappeared within several minutes after immersion, and a transparent film was left on the surface layer after lifting. Thereafter, the glass substrate was dried at 100° C. for 10 minutes.

The surface of the obtained film was observed by the FE-SEM to find a structure of fine irregularities in which plate crystals containing $Al_2O_3$ as a main component were tangled at random and in a complicated manner as in Example 1. For observation of the cross-section by the FE-SEM, a structure almost same as that in Example 1 was observed. The result of measurement by the SPM showed that the average surface roughness Ra' value (rim) was Ra'=32 nm and the surface area ratio $S_r$ was $S_r$=2.1.

(Note) The refractive index of the crystal layer of plate crystals shows values of a starting point and an ending point of a gradient refractive index part. For example, the refractive index 1.42-1.0 in Example 1 shows that the refractive index continuously decreases from 1.42 to 1.0 over a thickness of 230 nm.

[Evaluation of Performance]

If comparing transmittances at 550 nm for the fabricated transparent members, initial performances in Examples 1, 7 and 8, and Comparative Examples 1 and 4 are almost same and show high values. However, for the accelerated durability test at a high-temperature and high humidity, Examples 1, 7 and 8 having a layer containing $SiO_2$ as a main component show constant high values, whereas in Comparative Examples 1 and 4 having no such a layer, the performance is considerably degraded with elapse of time. Furthermore, for a base having a high refractive index, Examples 2, 3, 4, 5, 6, 9 and 10 show a high transmittance at an initial stage and after the accelerated durability test, whereas in Comparative Example 2 which does not have a layer containing $SiO_2$ as a main component and Comparative Example 3 which has, in a lower layer, a layer containing $TiO_2$ as a main component rather than a layer containing $SiO_2$ as a main component and in which the relation of $n_b \geq n_s \geq n_a$ is not met, the transmittance is low from an initial stage and the performance is considerably degraded as the accelerated test progresses.

Example 11

Figure 4:
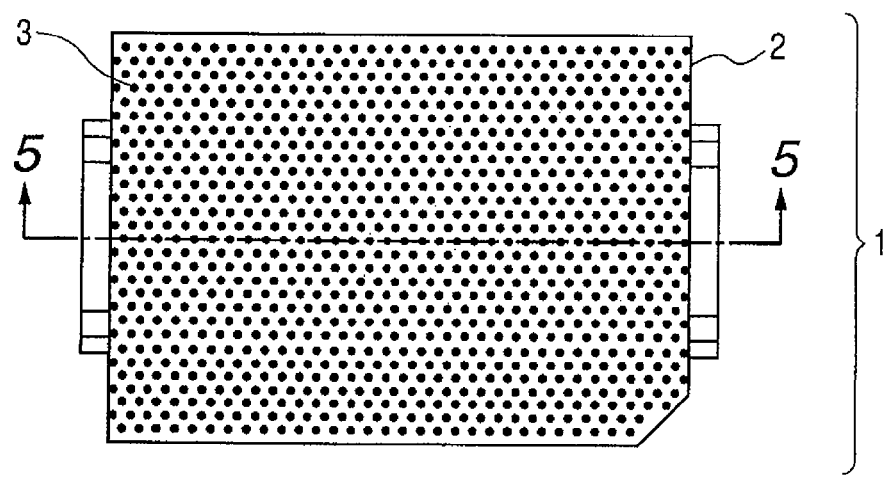
FIG. 4 is a front view of the Sixth Example of the present invention.

FIG. 4 is a front view of an optical member of Example 11. In this figure, an optical member 1 is a concave lens, and a substrate 2 is provided with an optical transparent member 3.

Figure 5:
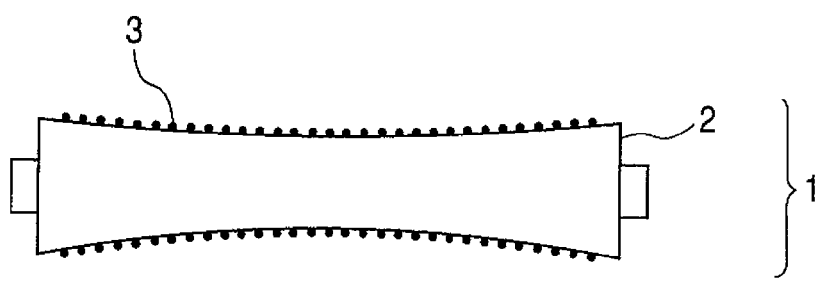
FIG. 5 is a sectional view of the Sixth Example of the present invention.

FIG. 5 shows a cross-section of the optical member of Example 11 cut along the 5-5 section in FIG. 4. A layer containing $SiO_2$ as a main component, a layer containing $Al_2O_3$ as a main component, and a layer having arranged plate crystals containing $Al_2O_3$ as a main component are formed on an optical surface, and the optical transparent member 3 having a shape of irregularities is formed on the outermost surface, whereby reflection of light at the optical surface is reduced.

In this example, the optical member is a concave lens, but the present invention is not limited thereto, and the lens may be either a convex lens or a meniscus lens.

Example 12

Figure 6:
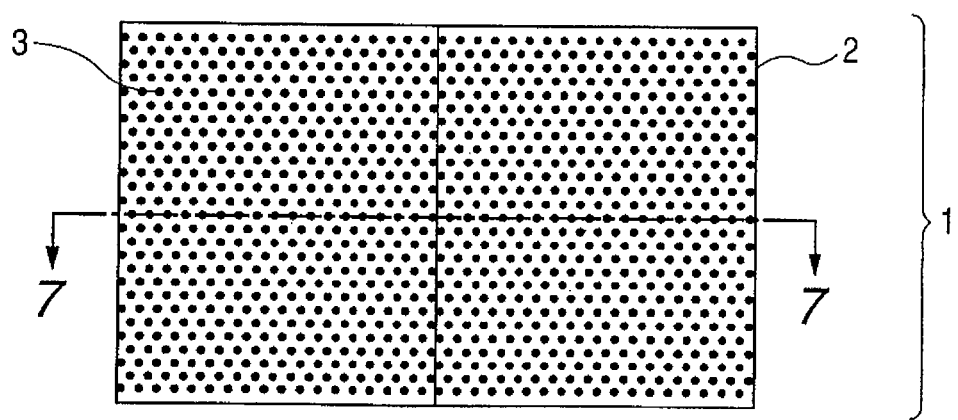
FIG. 6 is a front view of the Seventh Example of the present invention.

FIG. 6 is a front view of an optical member of Example 12. In this figure, an optical member 1 is a prism, and a substrate 2 is provided with an optical transparent member 3.

Figure 7:
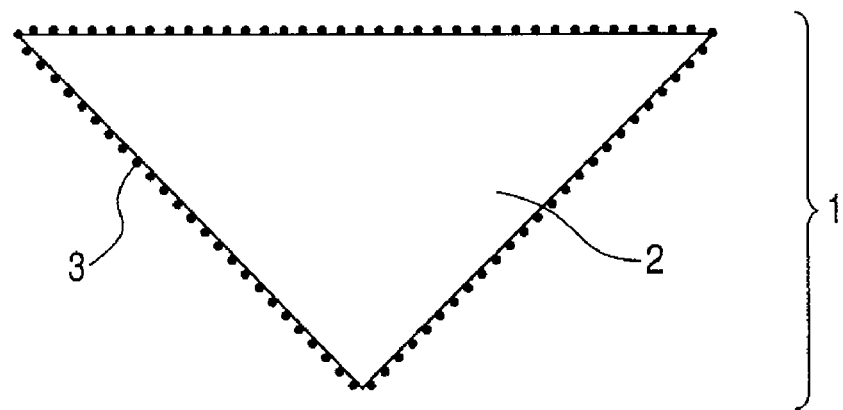
FIG. 7 is a sectional view of the Seventh Example of the present invention.

FIG. 7 shows a cross-section of the optical member of Example 12 cut along the 7-7 section in FIG. 6. A layer containing $SiO_2$ as a main component, a layer containing $Al_2O_3$ as a main component, and a layer having arranged plate crystals containing $Al_2O_3$ as a main component are formed on an optical surface, and the optical transparent member 3 having a shape of irregularities is formed on the outermost surface, whereby reflection of light at the optical surface is reduced.

In this example, angles formed by optical surfaces of the prism are 90° and 45°, but the present invention is not limited thereto, and the optical surfaces of the prism may form any angle.

Example 13

Figure 8:
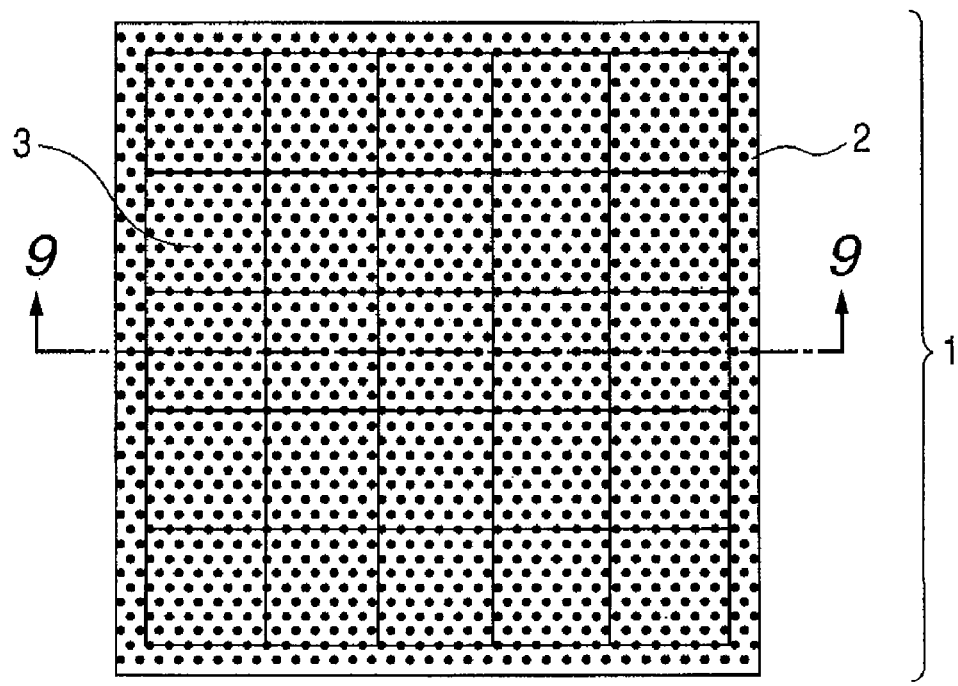
FIG. 8 is a front view of the Eighth Example of the present invention.

FIG. 8 is a front view of an optical member of Example 13 of the present invention. In this figure, an optical member 1 is a fly eye integrator, and a substrate 2 is provided with an optical transparent member 3.

Figure 9:
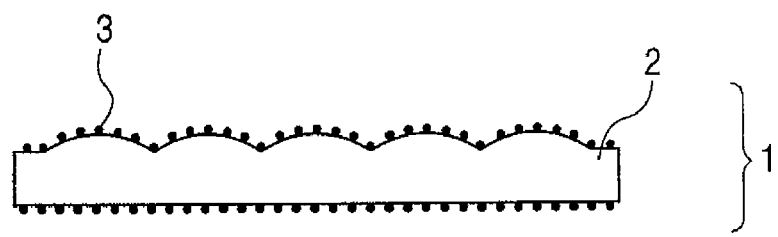
FIG. 9 is a sectional view of the Eighth Example of the present invention.

FIG. 9 shows a cross-section of the optical member of Example 13 cut along the 9-9 section in FIG. 8. A layer containing $SiO_2$ as a main component, a layer containing $Al_2O_3$ as a main component, and a layer having arranged plate crystals containing $Al_2O_3$ as a main component are formed on an optical surface, and the optical transparent member 3 having a shape of irregularities is formed on the outermost surface, whereby reflection of light at the optical surface is reduced.

Example 14

Figure 10:
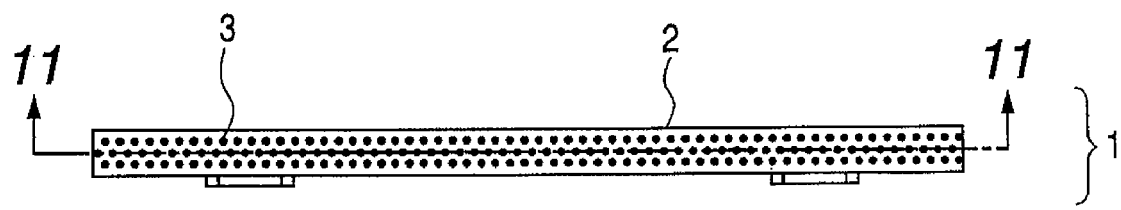
FIG. 10 is a front view of the Ninth Example of the present invention.

FIG. 10 is a front view of an optical member of Example 14 of the present invention. In this figure, an optical member 1 is an fθ lens, and a substrate 2 is provided with an optical transparent member 3.

Figure 11:
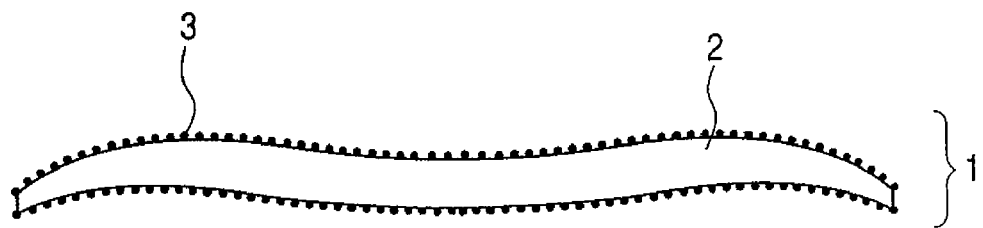
FIG. 11 is a sectional view of the Ninth Example of the present invention.

FIG. 11 shows a cross-section of the optical member of Example 14 cut along the 11-11 section in FIG. 10. A layer containing $SiO_2$ as a main component, a layer containing $Al_2O_3$ as a main component, and a layer having arranged plate crystals containing $Al_2O_3$ as a main component are formed on an optical surface, and the optical transparent member 3 having a shape of irregularities is formed on the outermost surface, whereby reflection of light at the optical surface is reduced.

Example 15

Figure 12:
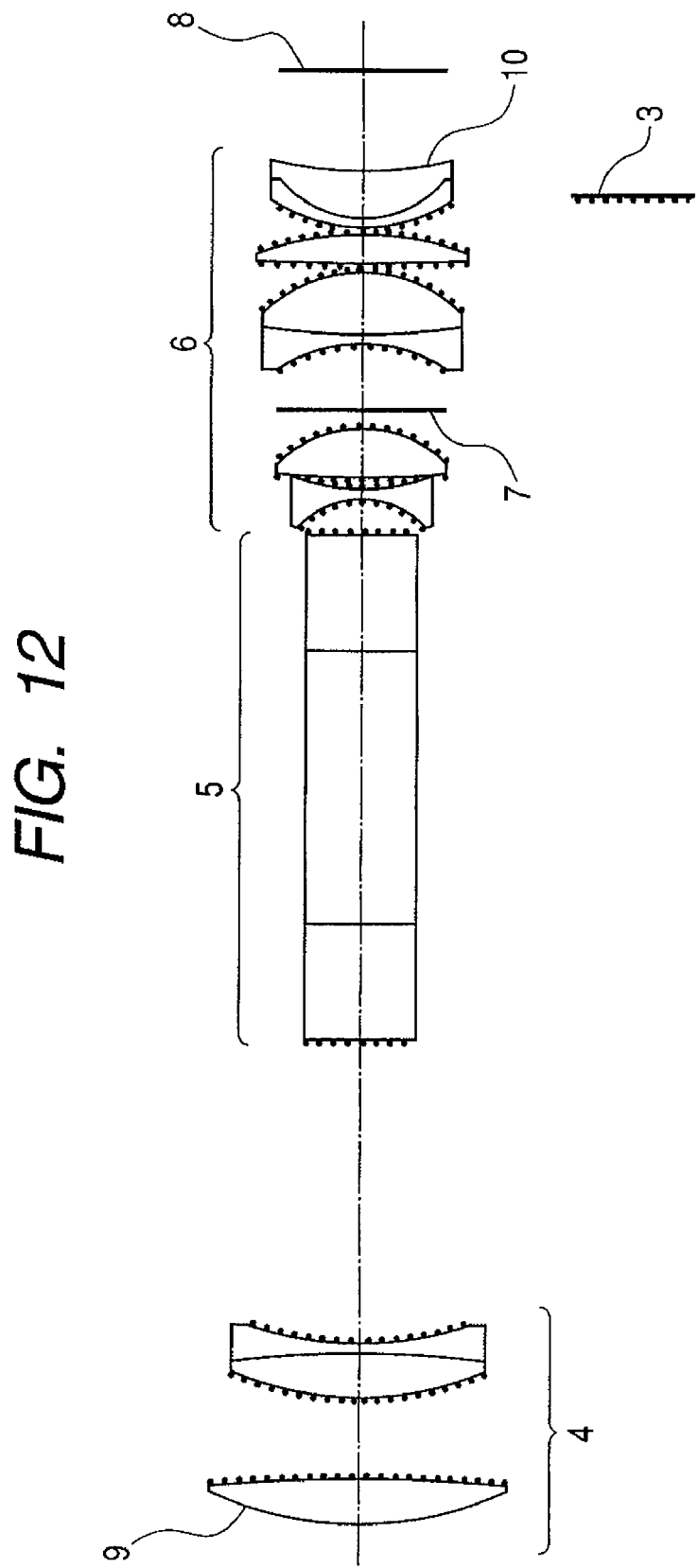
FIG. 12 is a sectional view of the Tenth Example of the present invention.

An example in which the optical member of the present invention is used in an observation optical system is shown as Example 15 of the present invention. FIG. 12 shows a cross-section of one of a pair of optical systems of a binocular.

In this figure, reference numeral 4 denotes an objective lens, reference numeral 5 denotes a prism (shown in an unfolded form) for inverting an image, reference numeral 6 denotes an eye lens, reference numeral 7 denotes an image formation surface, and reference numeral 8 denotes a pupil surface (evaluation surface). In the figure, reference numeral 3 (shown with a legend) denotes an optical transparent member relating to the present invention, wherein a layer containing $SiO_2$ as a main component, a layer containing $Al_2O_3$ as a main component, and a layer having arranged plate crystals containing $Al_2O_3$ as a main component are formed. The outermost surface has a shape of irregularities, whereby reflection of light at each optical surface is reduced. In this example, the optical transparent member 3 consisting of a structure of fine irregularities is provided neither on an optical surface 9 of the objective lens closest to an object nor on an optical surface 10 of the eye lens closest to the evaluation surface. The reason why the optical transparent member 3 is not provided on these surfaces is that its performance will be degraded due to contact while it is used, but the present invention is not limited thereto, and the optical transparent member 3 may be provided on the optical surfaces 9 and 10.

Example 16

Figure 13:
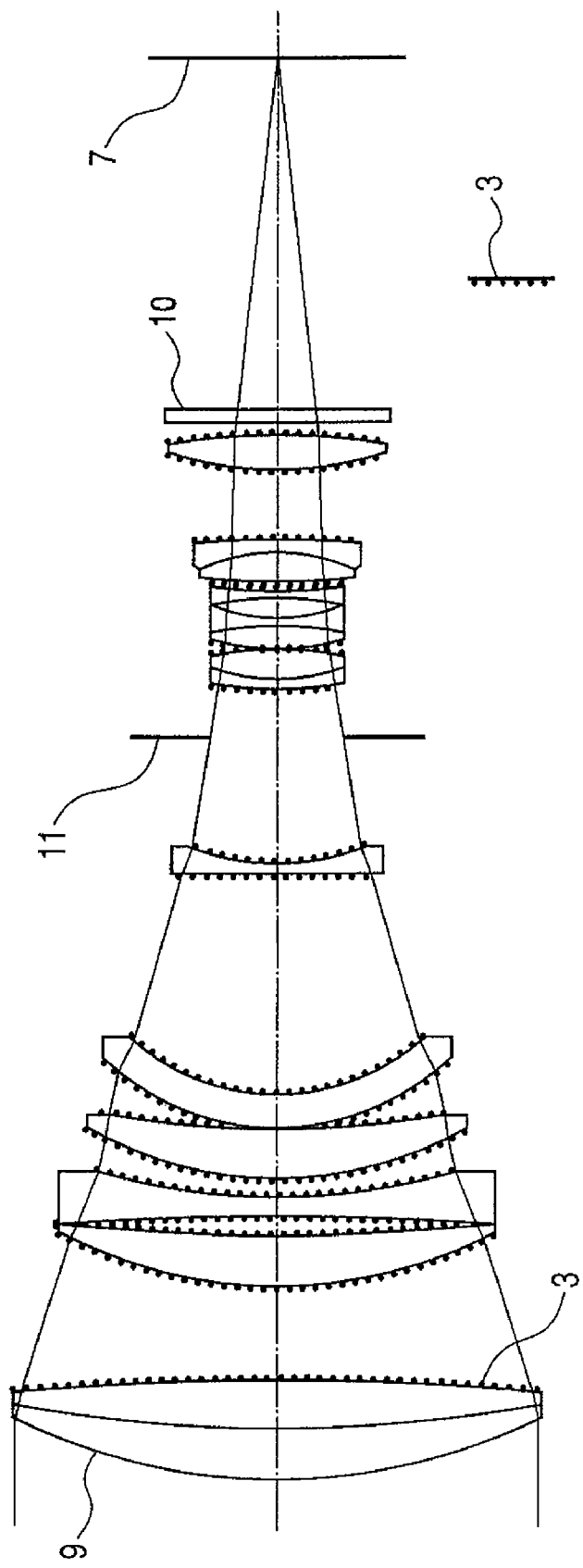
FIG. 13 is a sectional view of the Eleventh Example of the present invention.

An example in which the optical member of the present invention is used in an imaging optical system is shown as Example 16 of the present invention. FIG. 13 shows a cross-section of a photographing lens (telephoto lens is shown in this figure) of a camera or the like.

In this figure, reference numeral 7 denotes a film as an image formation surface, or a solid imaging device (photoelectric conversion element) such as a CCD or a CMOS, and reference numeral 11 denotes a stop. In the figure, reference numeral 3 (shown with a legend) denotes an optical transparent member relating to the present invention, wherein a layer containing $SiO_2$ as a main component, a layer containing $Al_2O_3$ as a main component, and a layer having arranged plate crystals containing $Al_2O_3$ as a main component are formed, and the outermost surface has a shape of irregularities, whereby reflection of light at each optical surface is reduced. In this example, the optical transparent member 3 consisting of a structure of fine irregularities is not provided on an optical surface 9 of the objective lens closest to an object. The reason why the optical transparent member 3 is not provided on the surface is that its performance will be degraded due to contact while it is used, but the present invention is not limited thereto, and the optical transparent member 3 may be provided on the optical surface 9.

Example 17

Figure 14:
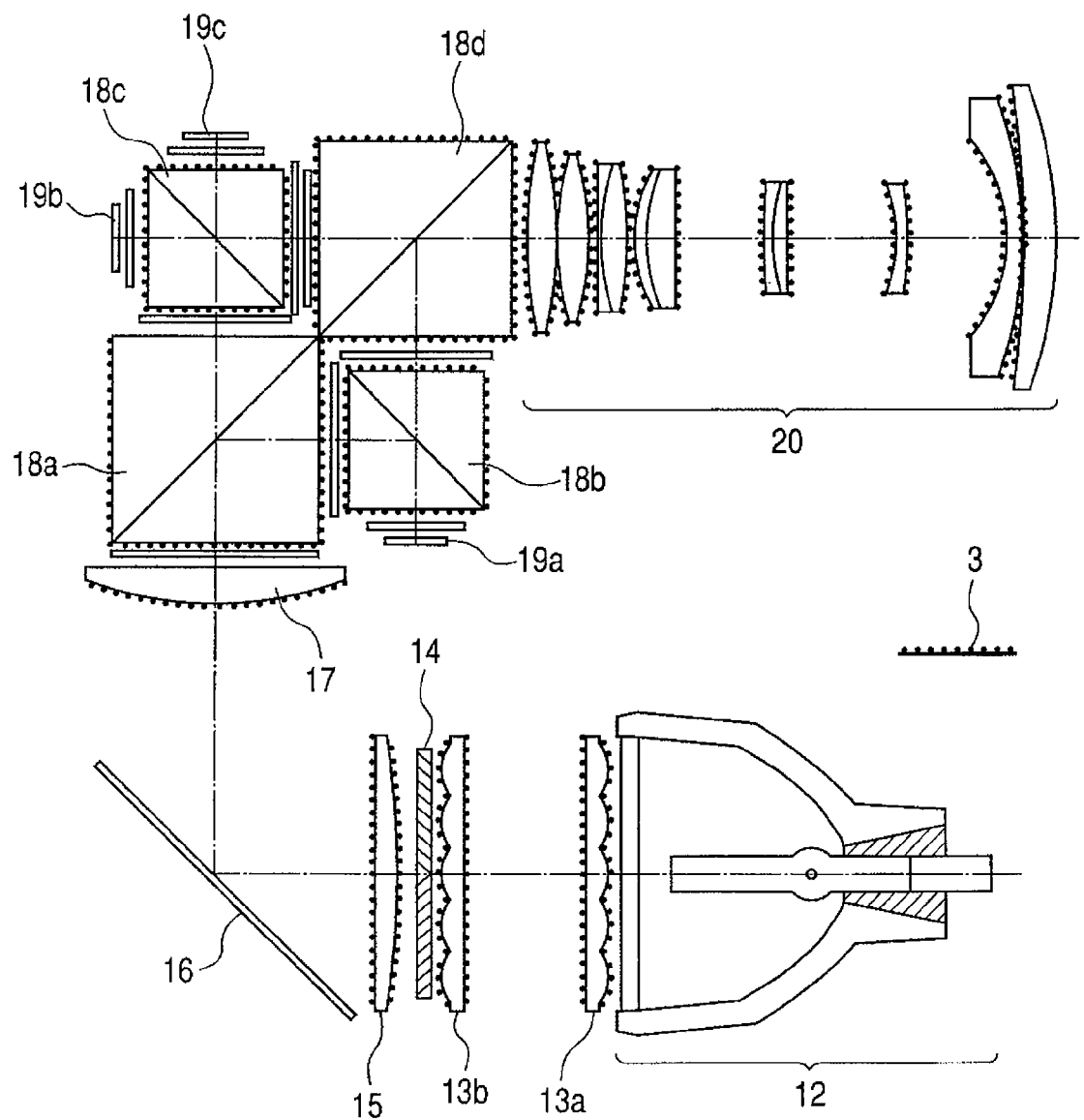
FIG. 14 is a sectional view of the Twelfth Example of the present invention.

An example in which the optical member of the present invention is used in a projection optical system (projector) is shown as Example 17 of the present invention. FIG. 14 shows a cross-section of a projector optical system.

In this figure, reference numeral 12 denotes a light source, reference numerals 13a and 13b denote fly eye integrators, reference numeral 14 denotes a polarizing conversion element, reference numeral 15 denotes a condenser lens, reference numeral 16 denotes a mirror, reference numeral 17 denotes a field lens, reference numerals 18a, 18b, 18c and 18d denote prisms, reference numerals 19a, 19b and 19c denote light modulation elements, and reference numeral 20 denotes a projection lens. In the figure, reference numeral 3 (shown with a legend) denotes an optical transparent member relating to the present invention, wherein a layer containing $SiO_2$ as a main component, a layer containing $Al_2O_3$ as a main component, and a layer having arranged plate crystals containing $Al_2O_3$ as a main component are formed, and the outermost surface has a shape of irregularities, whereby reflection of light at each optical surface is reduced.

Since the optical transparent member 3 of this example is configured to contain an inorganic component such as silica or alumina as a main component, it has a high heat resistance, and never suffers a degradation in performance even if placed at a position 13a so close to the light source 12 that the optical transparent member 3 is exposed to high heat.

Example 18

Figure 15:
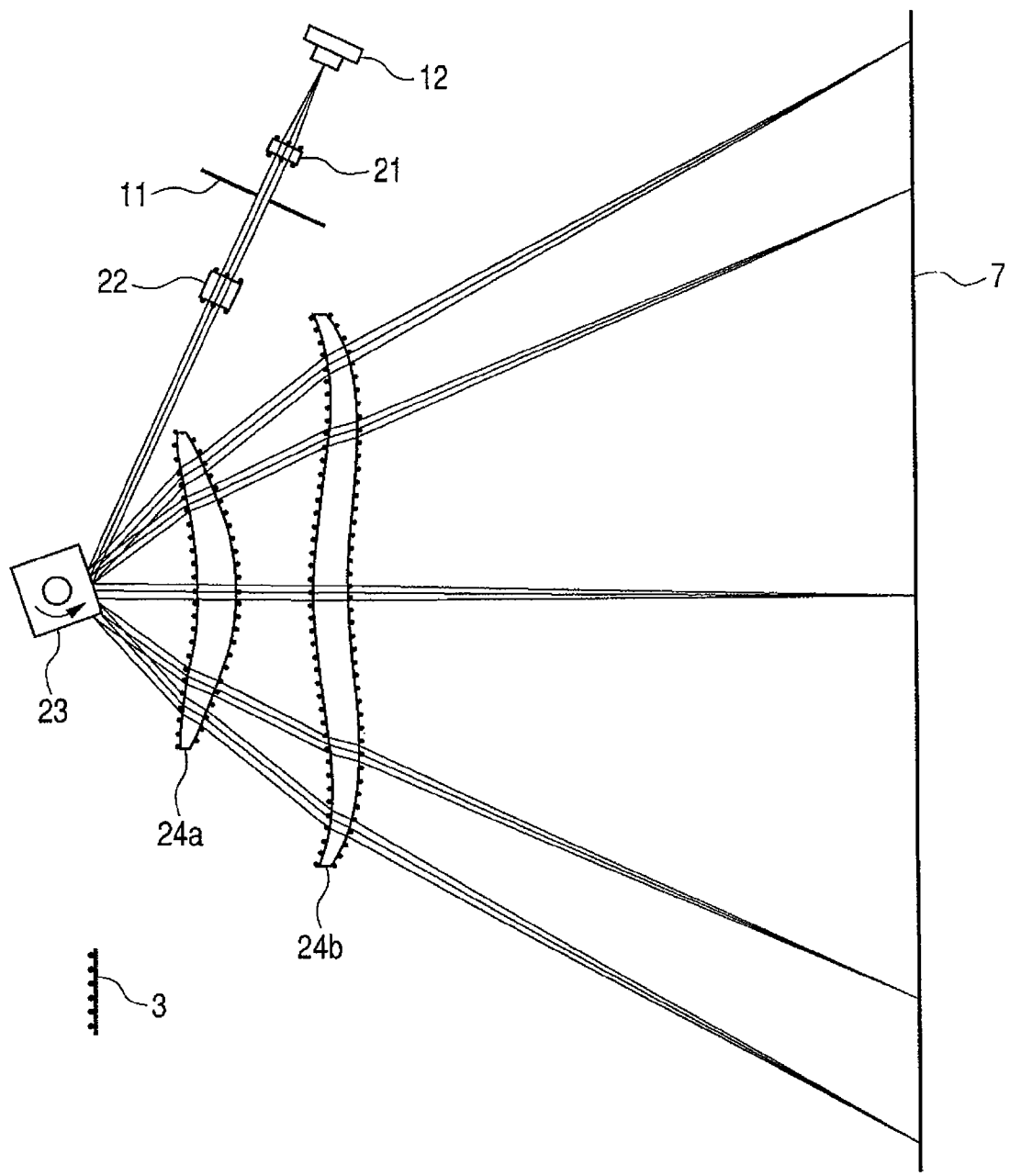
FIG. 15 is a sectional view of the Thirteenth Example of the present invention.

An example in which the optical member of the present invention is used in a scan optical system (laser beam printer) is shown as Example 18 of the present invention. FIG. 15 shows a cross-section of a scan optical system.

In this figure, reference numeral 12 denotes a light source, reference numeral 21 denotes a collimator lens, reference numeral 11 denotes an aperture stop, reference numeral 22 denotes a cylindrical lens, reference numeral 23 denotes a light deflector, reference numerals 24a and 24b denote fθ lenses, and reference numeral 7 denotes a mirror surface. In the figure, reference numeral 3 (shown with a legend) denotes an optical transparent member relating to the present invention, wherein a layer containing $SiO_2$ as a main component, a layer containing $Al_2O_3$ as a main component, and a layer having arranged plate crystals containing $Al_2O_3$ as a main component are formed, and the outermost surface has a shape of irregularities, whereby reflection of light at each optical surface is reduced to realize formation of high-quality images.

This application claims priority from Japanese Patent Application No. 2005-043003 filed on Feb. 18, 2005, which is hereby incorporated by reference herein.

What is claimed is:

1. A method for producing an optical member, comprising:
   forming a layer containing silicon oxide as a main component directly on a surface of a base,
   thereafter, forming a layer containing aluminum oxide as a main component directly on the layer containing silicon oxide as a main component, and
   subjecting the layer containing aluminum oxide as a main component to treatment with hot water, to thereby form an irregularity structure on the surface.

2. The method according to claim 1, wherein the layer containing silicon oxide as a main component contains at least one of titanium and zirconium.

3. The method according to claim 1, wherein the layer containing silicon oxide as a main component contains silicon oxide in a molar content of 40% or more which is the largest content among contents of all components.

4. The method according to claim 1, wherein the layer containing aluminum oxide as a main component contains aluminum oxide in a molar content of 50% or more.

5. The method according to claim 1, wherein a refractive index $n_b$ of the base, a refractive index $n_s$ of the layer containing silicon oxide as a main component, and a refractive index $n_a$ of the layer containing aluminum oxide as a main component satisfies a relation of $n_b \geq n_s \geq n_a$.

* * * * *